Sept. 30, 1941.  J. A. CLARKE  2,257,331
FUNDUS CAMERA
Filed Jan. 25, 1939  2 Sheets-Sheet 1
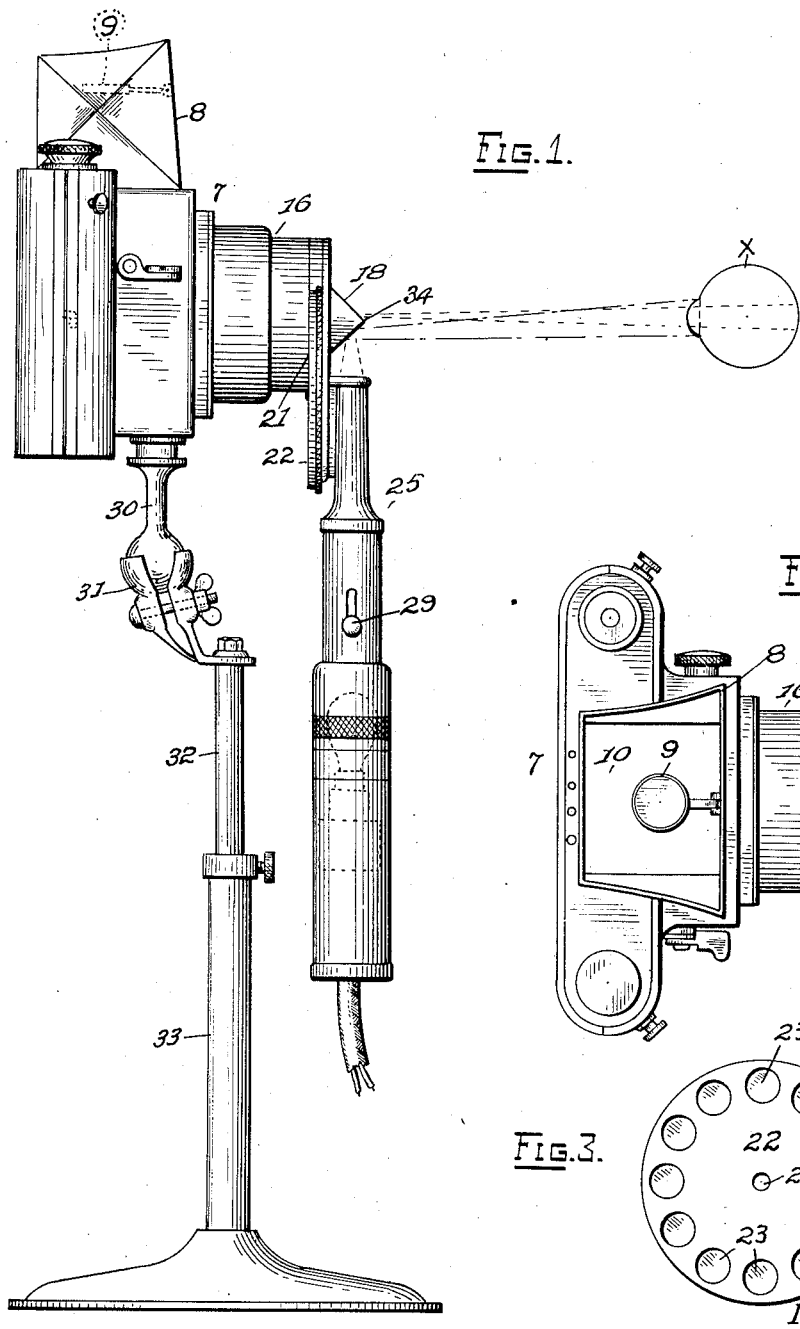
Inventor
John A. Clarke
By George R. Ericson
Attorney Sept. 30, 1941.  J. A. CLARKE  2,257,331
FUNDUS CAMERA
Filed Jan. 25, 1939  2 Sheets—Sheet 2
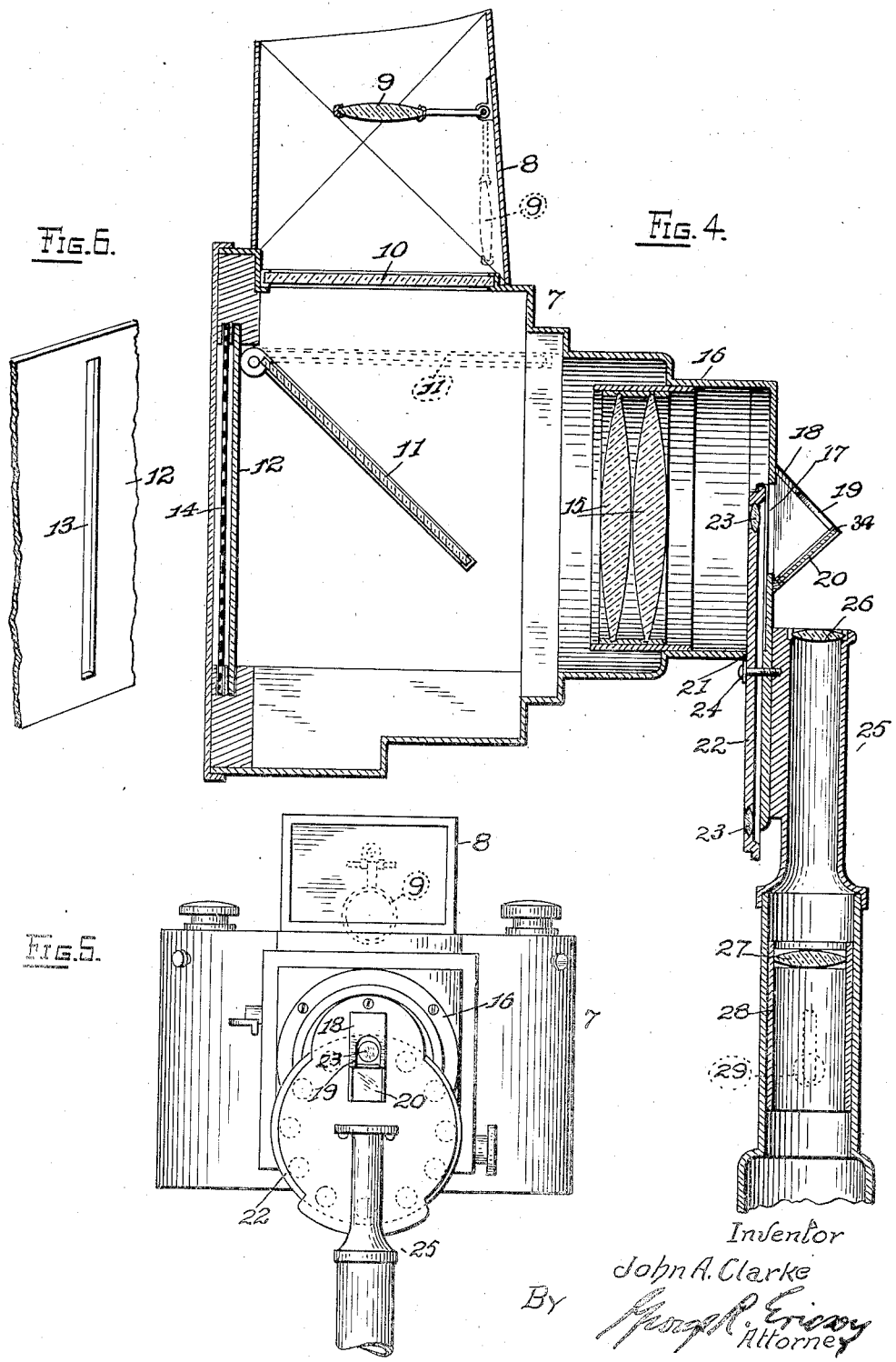

UNITED STATES PATENT OFFICE 2,257,331

FUNDUS CAMERA

John A. Clarke, St. Louis, Mo.

Application January 25, 1939, Serial No. 252,750

2 Claims. (Cl. 88—20)

This invention relates to improvements in a camera for photographing the eye, the same comprising a camera proper, having attached at close proximity to its lens, a means for directing a beam of light against an inclined mirror reflecting the light into the eye so that the fundus of the eye can be clearly observed and the condition clearly recorded on a film.

The arrangement in general is to equip a camera with an illuminating means by which the rays traverse the peripheral portion of the patient's pupil, this apparatus is what is known in the art as an ophthalmoscope which is equipped with a set of lenses for directing the beam of light against an angular mirror for reflecting the light into the eye.

The general object is to arrange the camera with a magnifying or enlarging glass, the same located in the focusing hood for the purpose of enabling the operator to obtain a more accurate focus, as well as to observe and study the condition of the morbidly affected eye, at the same time taking a photograph of the fundus which will be of great value in ophthalmic practice, it produces an excellent means of obtaining demonstrable records of morbid changes of the retina in the various stages of the disease, such photographs are of utmost value in the diagnosis and prognostic observation as well as the treatment of many affections of the eye and the system in general.

The chief problem involved in the construction and arrangement of the apparatus for the purpose of photographing the fundus of the eye consists in devising an arrangement which may be capable of producing a distinct image of the affection on the ground glass for observation, also on the film when the camera is snapped.

Another object of the invention is the general arrangement, construction and combination of parts as will be fully hereinafter described and set forth in the claims.

Figure 1 is a side view of my complete invention,

Figure 2 is a top plan view of the same.

Figure 3 is a detail view of a rotatable lens supporting disc made use of.

Figure 4 is an enlarged sectional view showing the general construction and arrangement of the several parts involved.

Figure 5 is a front view of the invention.

Figure 6 is a detail perspective view of a portion of the shutter used, the same being provided with an elongated exposure slit.

In the general construction of the invention, I provide a camera preferably of the Graphlex type, consisting of a camera housing or body portion 7 on which is mounted a focusing hood 8 to the interior of which is hingedly mounted a magnifying or enlarging glass 9, it can be arranged in horizontal position when used for focusing and studying the image reflected on the ground glass, and to be folded out of the way when closing the hood as shown by dotted lines in Figure 4.

Beneath the focusing hood 8 and in the body of the camera is located a ground glass 10 on which the image of the object to be photographed is visible, and in the body portion and below the ground glass 10 is conveniently positioned a mirror 11 which reflects the image to the ground glass, and it is so arranged that when the exposure release is pressed, the mirror 11 swings upwardly automatically out of the way as that indicated by dotted lines in Figure 4, at the same time instantly releasing the shutter 12 its exposing aperture passing across the film exposing the film.

The shutter in this instance is provided with an exposure slot 13 which passes in its travel across the film 14 recording the picture.

At the forepart of the camera body is adjustably mounted a pair of lenses 15 for focusing and are housed in a cylindrical covering 16 the front of which has an opening 17 covered with a triangular hood 18 the lower part of its front having an opening 19 while the lower part is provided with a mirror 20.

The cylindrical covering is provided with a slot 21 in which is seated a disc 22 the same provided with a plurality of lenses 23 each of a different power or strength, and during the focusing process this disc is rotated bringing the various lenses in line until the desired clearness is obtained.

This disc is pivoted at the point 24 to a frame suitably provided, and to this frame is also supported the ophthalmoscope 25 which in this instance comprises a tubular member having in its upper end a lens 26, and in the body portion beneath the lens 26 is an additional lens 27 supported in an adjustable sleeve 28 which can be adjusted up or down by means of the button 29.

In this tubular member and below the lens 27 is positioned a light bulb which may be illuminated by means of the regular lighting system or through battery as found desirable.

The position of the lens 26 relative to the mirror 20 is such that the light beam directed against it is reflected into the eye in a manner as shown in Figure 1, the eye in this instance being indicated by the letter X.

To obtain the desired result, the mirror 20 is placed on an angle of approximately 45 degrees with one edge 34 of the mirror coming approximately to the center of the beam of light its reflected beams directed into the eye penetrating the same so that the fundus of the eye is clearly visible and any defects of the eye disclosed.

The bottom of the camera is provided with a ball stud 30 which is supported in a socket 31 the connection acting as universal point, and it is supported on a rod 32 telescopically mounted in a tubular base 33. By this means the camera may be adjusted to any desirable position for proper focusing.

The essential feature of the invention is to equip a camera with a means for directing a beam of light into the eye so as to thoroughly illuminate the fundus of the eye and in direct line with the lens so that a picture of the fundus can be readily and clearly taken showing the real condition of the eye.

Other changes may be made in the construction and arrangement of the invention above set forth without departing from the real spirit and purpose thereof; and it is my intention to cover by the following claims equivalents which may be readily and reasonably included within their scope.

I claim:

1. A device for photographing the eye comprising a camera, a focusing hood mounted thereon, an enlarging glass mounted in said hood, a ground glass below the enlarging glass, a swinging mirror beneath the ground glass for reflecting the image on the ground glass, lenses positioned in the fore part of the camera, a rotatable disc having a plurality of lenses selectively movable into the path of focus, a hood fixed to the forward end of the camera, said hood being formed with an opening substantially aligned with the selectively positioned lenses, a mirror arranged in an angular position and forming a portion of the wall of said hood, said mirror having its inner edge approximately at the center line of focus, and a light directing means supported by said camera and arranged to direct an adjustable beam of light against said mirror.

2. A device for photographing the eye comprising an adjustably mounted camera, a magnifying means in the focusing hood of the camera for enlarging the image shown on the ground glass, a focusing lens arranged within a housing at the fore part of said camera, said housing being formed with a slot and a depending front wall portion, a rotatable disc secured to the inner face of said depending housing wall and having a plurality of lenses selectively movable through said slot into the path of focus, and a light directing means supported by and secured to the outer face of said depending wall and arranged to direct an adjustable beam of light against said mirror.

JOHN A. CLARKE.